(12) United States Patent
Owens et al.

(10) Patent No.: US 7,814,839 B2
(45) Date of Patent: Oct. 19, 2010

(54) INVERTED CONVEYOR

(75) Inventors: Donald E. Owens, Cincinnati, OH (US); Charles P. Tabler, Cincinnati, OH (US)

(73) Assignee: OCS Intellitrak, Inc., Cincinnati, OH (US)

( * ) Notice: Subject to any disclaimer, the term of this patent is extended or adjusted under 35 U.S.C. 154(b) by 197 days.

(21) Appl. No.: 12/006,693

(22) Filed: Jan. 4, 2008

(65) Prior Publication Data
US 2008/0210523 A1 Sep. 4, 2008

Related U.S. Application Data

(60) Provisional application No. 60/879,176, filed on Jan. 8, 2007.

(51) Int. Cl.
*B61B 9/00* (2006.01)

(52) U.S. Cl. .............................. 104/166; 105/30; 105/73

(58) Field of Classification Search ................. 104/166, 104/167, 172.3, 246, 245, 248, 140, 139, 104/124, 165, 172.2, 242; 105/30, 153, 154, 105/155, 73
See application file for complete search history.

(56) References Cited

U.S. PATENT DOCUMENTS

| | | | |
|---|---|---|---|
| 3,164,104 A | 1/1965 | Hunt | |
| 3,850,250 A | 11/1974 | Ohrnell | |
| 4,203,511 A | 5/1980 | Uhling | |
| 4,265,178 A | 5/1981 | Veith | |
| 4,358,999 A | 11/1982 | Nagahori | |
| 4,367,683 A | 1/1983 | Tokunaga | |
| 4,671,184 A * | 6/1987 | Fukuda | 104/118 |
| 4,759,439 A | 7/1988 | Hartlepp | |
| 4,909,373 A | 3/1990 | Geerts | |
| 4,936,222 A | 6/1990 | Murai | |
| 4,993,326 A | 2/1991 | Bergemann | |
| 5,141,094 A | 8/1992 | Speckhart et al. | |
| 5,143,201 A | 9/1992 | Speckhart et al. | |
| 5,154,275 A | 10/1992 | Speckhart et al. | |
| 5,335,781 A | 8/1994 | Miyagawa et al. | |
| 5,806,655 A | 9/1998 | Tabler | |
| 5,919,023 A | 7/1999 | Owens, Jr. | |
| 5,953,995 A * | 9/1999 | Saillant | 104/88.03 |
| 6,032,785 A | 3/2000 | Beall, Jr. | |
| 6,170,642 B1 | 1/2001 | Galan et al. | |
| 6,179,701 B1 | 1/2001 | Tieleman | |
| 6,267,060 B1 | 7/2001 | Owens, Jr. | |
| 6,293,388 B1 | 9/2001 | Felter | |
| 6,457,418 B1 * | 10/2002 | Persson | 104/166 |
| 7,125,330 B2 | 10/2006 | Beeksma et al. | |
| 7,178,661 B2 | 2/2007 | Tabler | |

* cited by examiner

*Primary Examiner*—Mark T Le
(74) *Attorney, Agent, or Firm*—Chase Law Firm, L.C.

(57) ABSTRACT

A conveyor is powered by a rotating, generally horizontal drive tube or shaft engaged by angularly disposed trolley wheels, in which trolleys support the conveyed products or materials above the drive tube and clear of any parts of the conveyor structure that would interfere with the desired path of travel. Each of the trolleys is provided with load wheels which ride on load rails above the drive tube and associated drive wheels, thereby providing a structure upon which a platform or other support may be mounted for bearing the transported products.

3 Claims, 7 Drawing Sheets

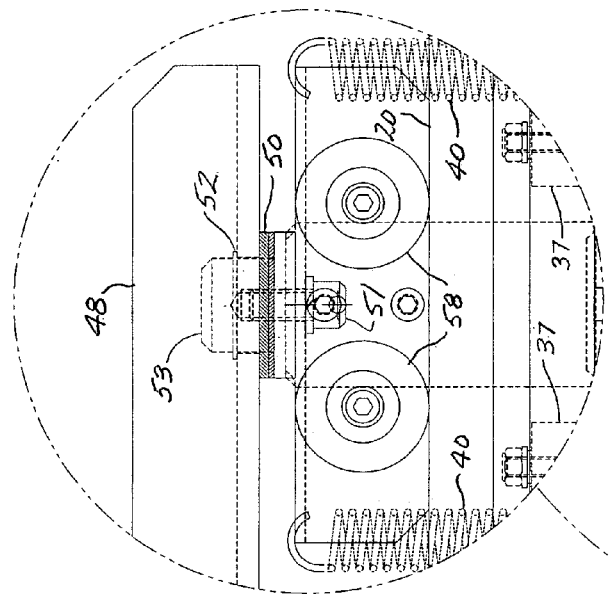
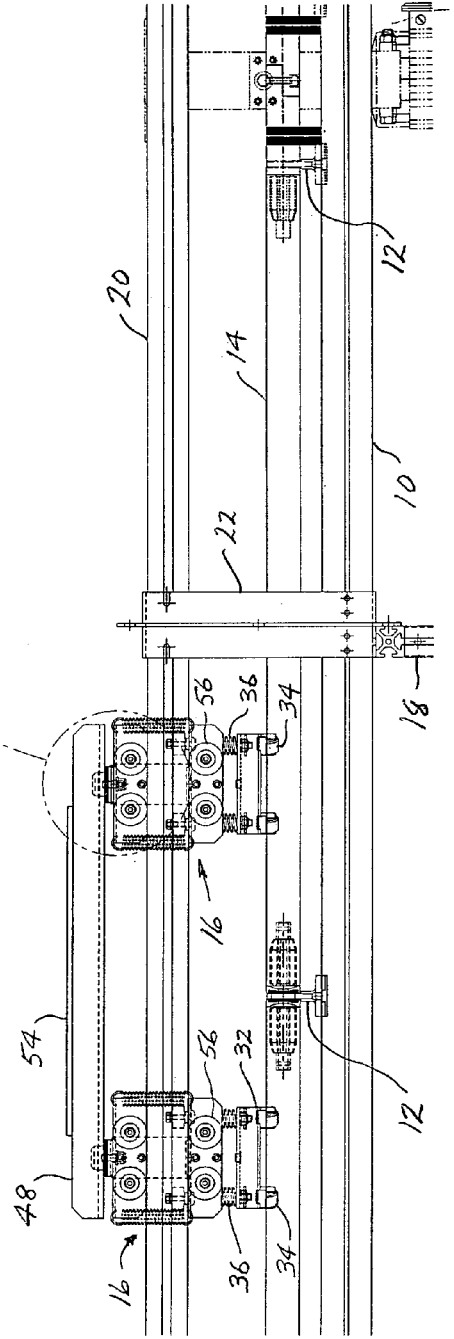
Fig. 1A
Fig. 1

INVERTED CONVEYOR

CROSS REFERENCE TO RELATED APPLICATION

This application claims the benefit of a prior filed, application Ser. No. 60/879,176, filed Jan. 8, 2007, entitled INVERTED OVERHEAD CONVEYOR.

FIELD OF THE INVENTION

This invention relates to conveyors for transporting parts, products or materials in manufacturing, assembly or treatment operations.

BACKGROUND OF THE INVENTION

Overhead conveyors are utilized in various production, assembly and treatment environments to transport parts or products through various operational stages. Typically, such conveyors employ a rotating, generally horizontal drive tube or shaft that supports trolleys from which the load is suspended. Wheels on the trolleys ride on the upper surface of the rotating drive tube, and each is mounted for rotation about a driven wheel axis that is non-parallel and non-perpendicular to the drive tube axis, preferably at an acute angle to the drive axis. Overhead conveyors utilizing a drive where the load is suspended beneath the drive tube are disclosed, for example, in U.S. Pat. No. 4,203,511, issued May 20, 1980 to Uhing.

Overhead conveyors of this type, however, are restricted to applications in which the products being transported may be suspended beneath the drive tube. Accordingly, belt conveyors and similar configurations are typically used when it is desired to transport products or materials along a path that is spaced above the conveyor drive. However, belt conveyors do not provide the advantages of conveyors powered by a rotating drive tube in quiet operation and the safety provided by the friction drive which stops the advancement of the conveyed products if resistance to movement is encountered.

SUMMARY OF THE INVENTION

In an embodiment of the present invention the aforementioned problem is addressed by providing a conveyor powered by a rotating, generally horizontal drive shaft or tube engaged by angularly disposed trolley drive wheels, wherein trolleys support the conveyed products or materials above the drive tube and clear of any parts of the conveyor structure that would interfere with the desired path of travel. Each of the trolleys is provided with load wheels which ride on load rails above the drive tube and associated drive wheels, thereby providing a structure upon which a platform or other support may be mounted for bearing the transported products.

Other advantages of this invention will become apparent from the following description taken in connection with the accompanying drawings, wherein is set forth by way of illustration and example, an embodiment of the present invention.

BRIEF DESCRIPTION OF THE DRAWINGS

FIG. 1 is a side elevational view of a conveyor powered by a drive tube beneath the product support, parts thereof being broken away or shown in broken lines for clarity (driven wheels behind the drive tube are shown in full lines).

FIG. 1A is an enlarged view of a portion of one of the trolleys shown in FIG. 1.

DETAILED DESCRIPTION

Figure 2:
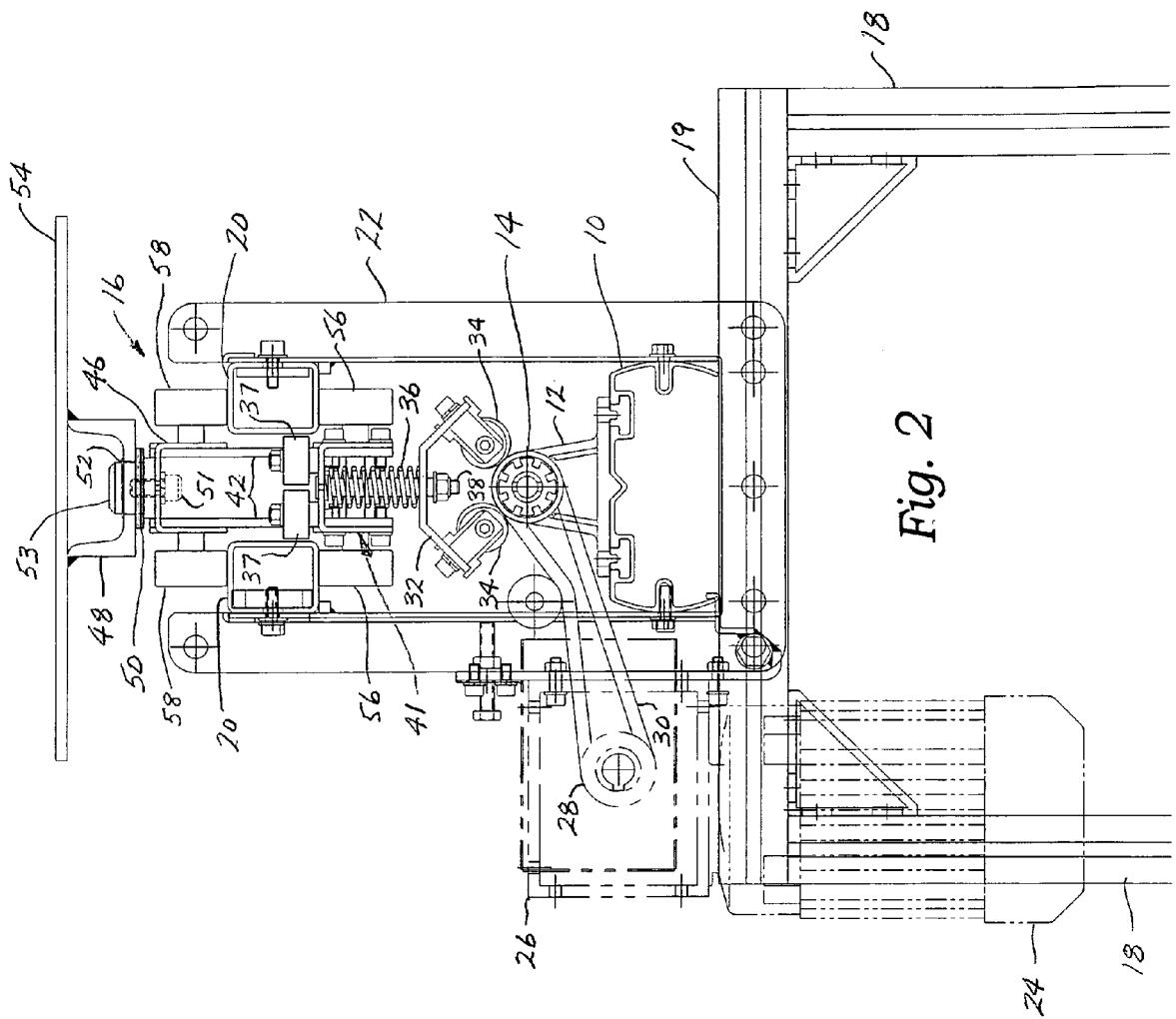
FIG. 2 is a vertical cross-section through the conveyor at a right angle to the drive tube, showing a trolley of the present invention as viewed in the direction of the transporting path, an upper connecting spring of the trolley being removed for clarity.

Referring to the drawings, FIG. 1 illustrates a stretch of a horizontally extending conveyor comprising a portion of a horizontal span of a drive beam 10 to which longitudinally spaced bearing units 12 are mounted for the purpose of supporting a drive shaft or tube 14 of the conveyor system, two trolleys 16 thereof being shown. Legs 18 of upright supports (one of which is shown in FIG. 1) elevate the conveyor system in the conventional manner above a floor or other underlying surface (not shown) and also maintain a predetermined spacing between the drive tube 14 a pair of spaced load rails 20 disposed above the drive tube 14. As shown in FIG. 2, an upright frame comprising an inverted, U-shaped hanger assembly 22 supports the load rails 20 above a cross bar 19. Drive is provided typically by an electric motor 24 coupled via gearbox 26 to a drive pulley 28 connected to drive tube 14 via belt 30.

Referring particularly to FIGS. 3-6, each of the trolleys 16 of the present invention is inverted as compared with trolleys of prior overhead conveyors where products are carried by the conveyor beneath the trolleys. A yoke plate member 32 carries four driven wheels 34 as is clear in FIGS. 3 and 5, all of which contact the surface of the drive tube 14. The axes of the four driven wheels 34 are at an acute angle with respect to the axis of the drive tube 14 as is typical in conveyor systems in order to propel the trolley 16 in an axial direction with respect to the drive tube 14 when the latter is driven by the motor 24. The wheels 34 are pressed into contact with the drive tube 14 by a vertically oriented coil spring component 36 that is coaxial with and surrounds a depending stem 38 (FIG. 3) to which the yoke plate 32 is mounted. It will be appreciated that two spaced stems 38 and associated coaxial springs are employed at the front and rear of the trolley 16, one of which is seen in the figures. As will be further appreciated hereinbelow, the trolley 16 comprises two vertically spaced parts (spaced upper and lower sections 39 and 41) each elongated in the direction of travel and having an inverted, U-shaped transverse configuration. The sections 39 and 41 are maintained in operative interrelationship by a pair of coil springs 40, both of which can be seen in the side view of FIG. 4. Lateral displacement is prevented by two pairs of guide wheels 37 on lower section 41 which rotate about vertical axes and contact the respective inner faces of load rails 20.

A pair of upstanding trolley tabs 42 (see particularly FIG. 2) each secured by two vertically spaced bolts 43 to the center portion of the lower trolley section 41 are received in respective spaced slots 44 (FIGS. 4 and 6) in an elongated, inverted U-shaped top plate 46 of the upper section 39 of the trolley and thus permit the upper and lower trolley sections to be united and held by the springs 40, upper section 39 being movable vertically on tabs 42 against the bias of springs 40 to conform to any irregularities in the load rails 20. A channel-shaped load bar 48 atop the trolley 16 (FIG. 2) has an opening in its base receiving a load bar pin 53 and is seated on a thrust bearing 50 and secured by a snap ring 52. The pin 53 is secured by an upright retaining screw 51. It should be understood that in FIGS. 4-6 the thrust bearing 50 is directly beneath the snap ring 52 as the trolley is shown separately removed from the conveyor for clarity. Installed and in operation as illustrated in FIGS. 1 and 2 supported by two spaced trolleys 16, the load bar 48 is interposed between the thrust bearing 50 of each trolley and the associated snap ring 52.

A horizontal product platform 54 or other support as desired is welded to the load bar 48 and thus may receive parts, products or other items as required (not shown) for movement along the conveyor line. It should be noted in this respect that platform 54 and the load items to be placed thereon are entirely clear of the underlying conveyor apparatus throughout the desired path of travel of the conveyed items along the conveyor line.

Figure 3:
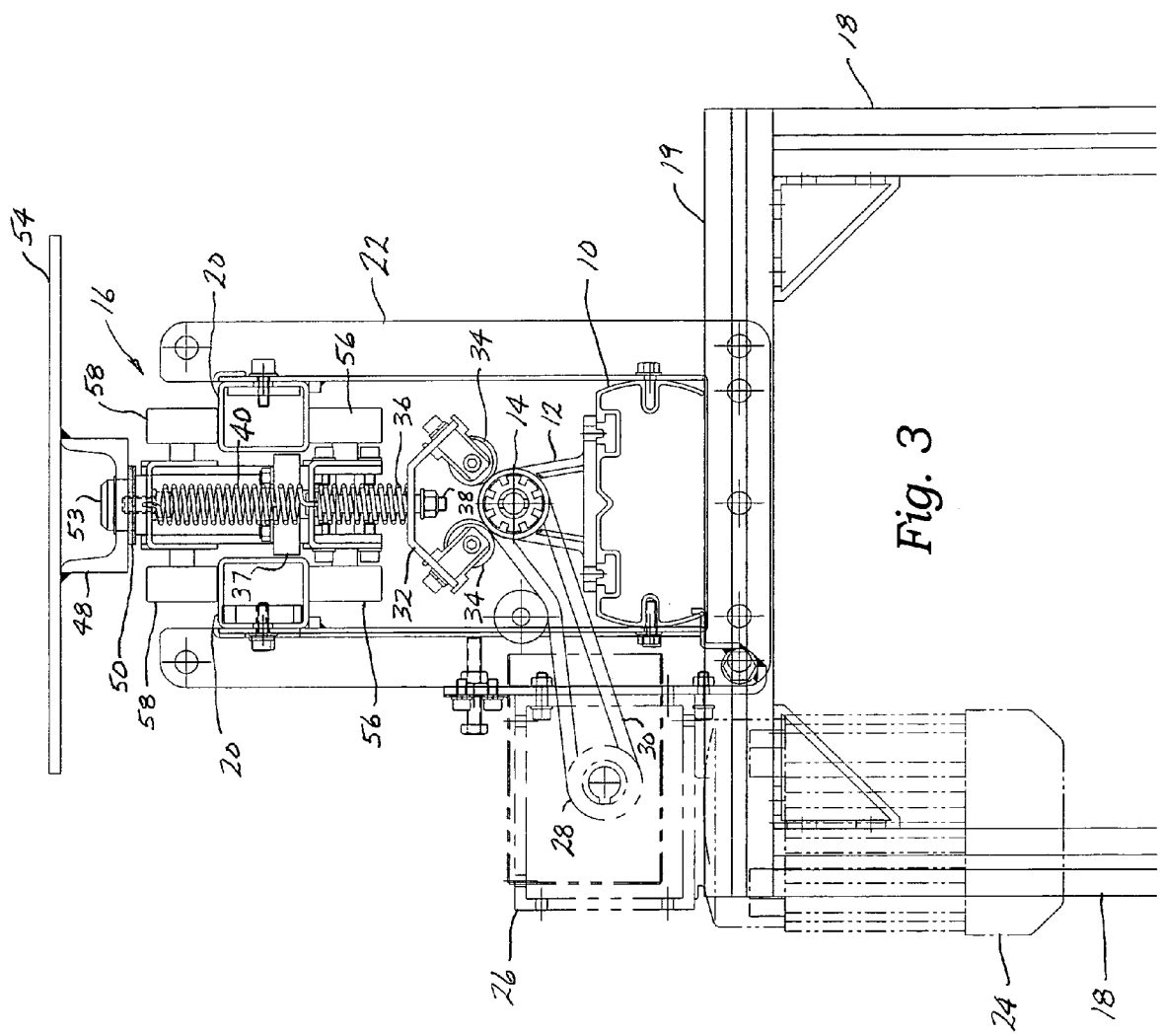
FIG. 3 is a view similar to FIG. 2 showing the trolley including the upper connecting spring.
Figure 4:
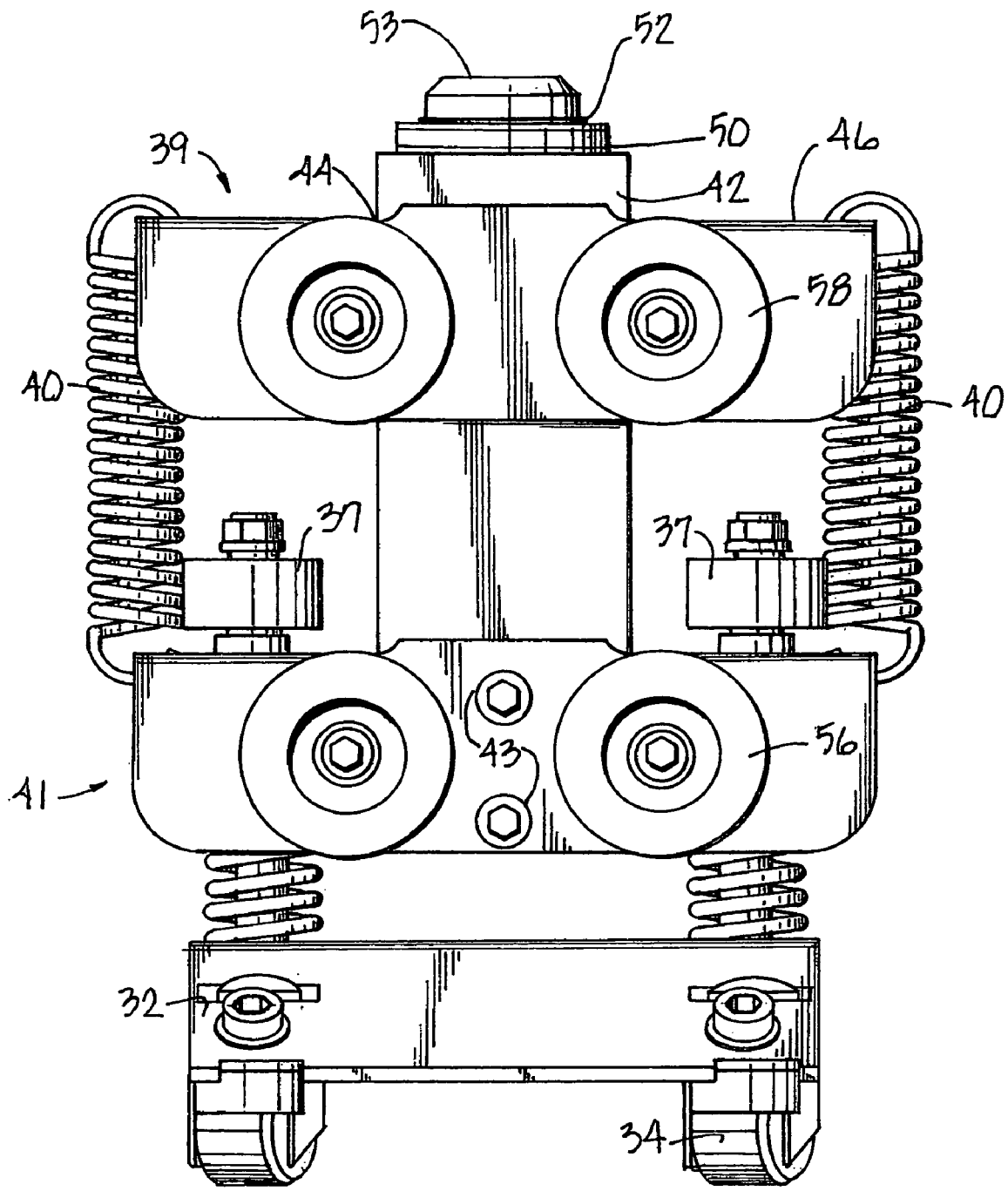
FIG. 4 is a side elevational view of one of the trolleys of the present invention removed from the drive tube and associated conveyor structure for clarity.
Figure 5:
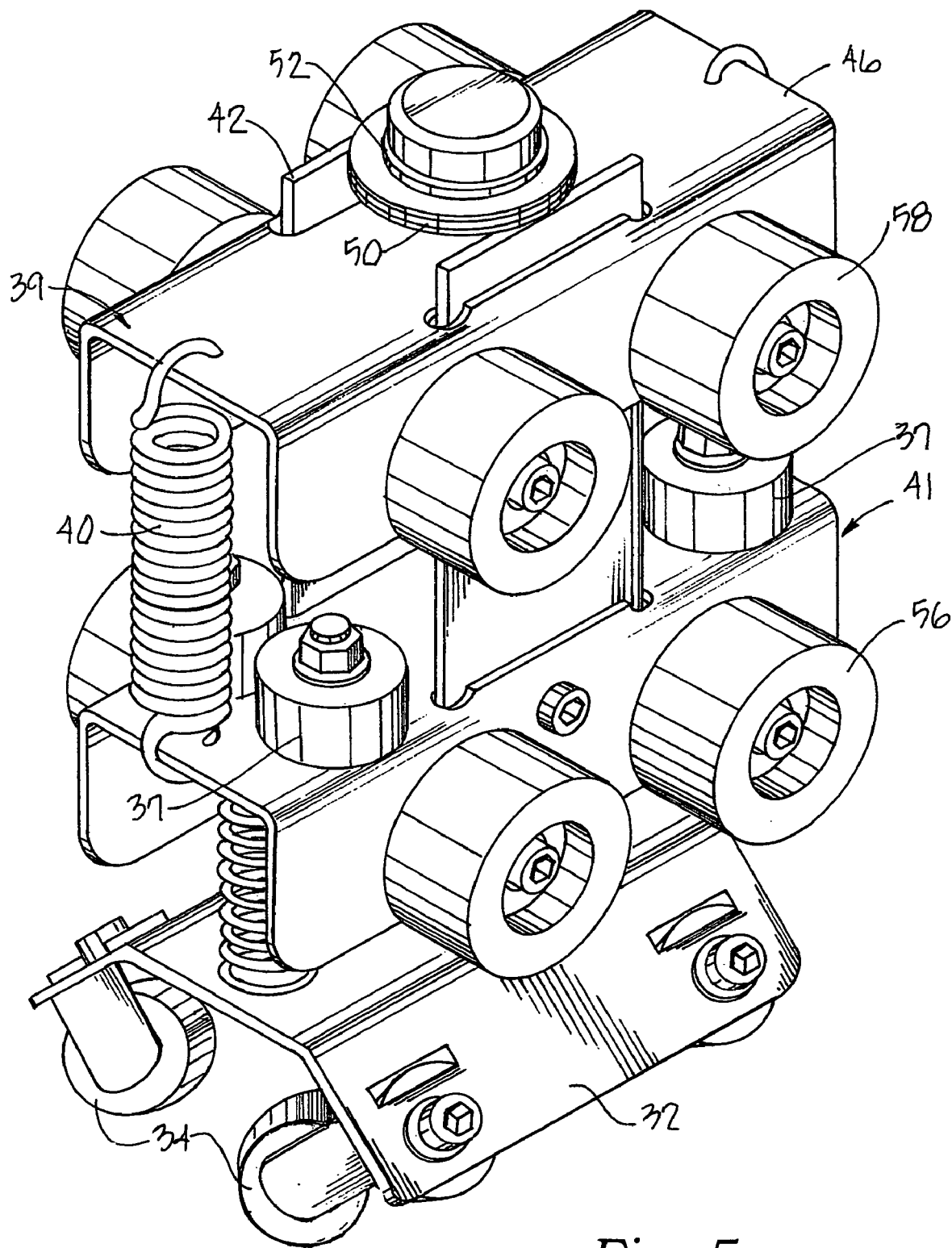
FIG. 5 is a perspective view of the trolley of FIG. 4.
Figure 6:
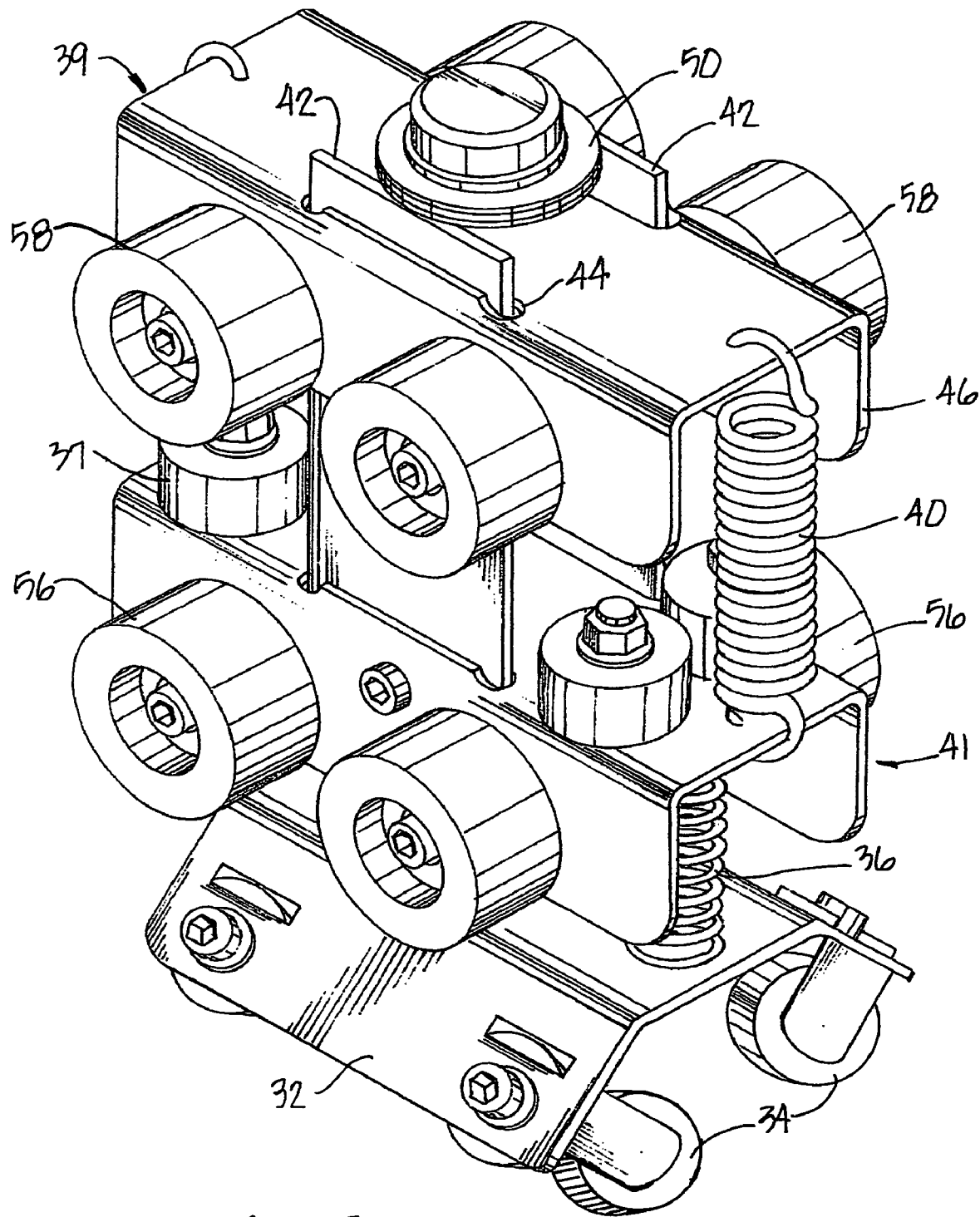
FIG. 6 is a perspective view similar to FIG. 5 but viewing the trolley from the opposite side thereof.
Figure 7:
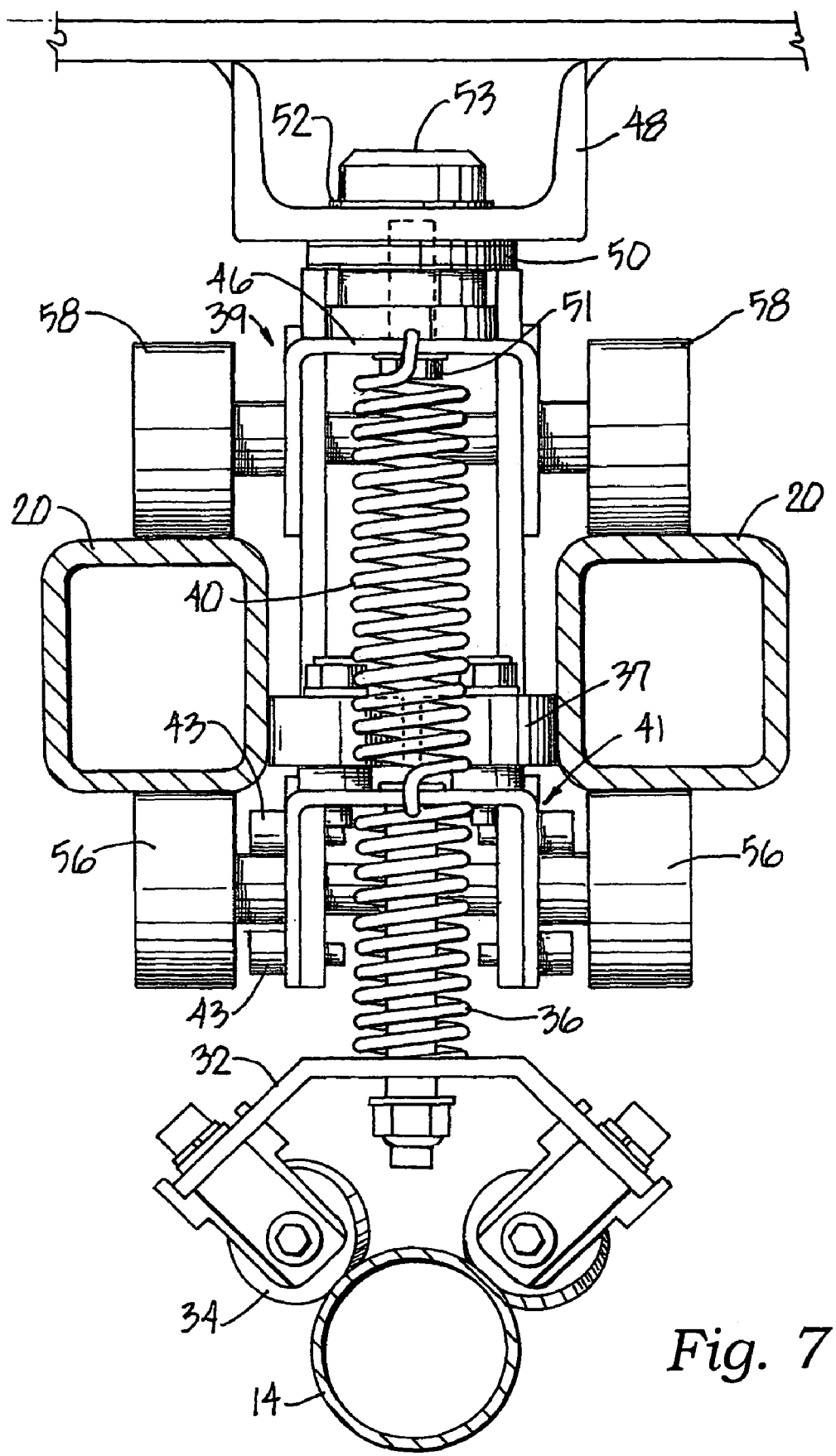
FIG. 7 is an end view looking essentially along the axis of the transporting path of the conveyor.

The lower, inverted U-shaped section 41 of the trolley body extends fore and aft and has four load wheels 56 comprising a front and rear pair thereof as is clear in FIGS. 5 and 6. Similarly, the upper, inverted U-shaped section 39 has front and rear pairs of load wheels 58, the load wheels 58 and 56 cooperating to embrace the two laterally spaced load rails 20 and run on the upper and lower surfaces thereof as shown in FIGS. 1-3. Therefore, in operation the four load wheels 56 of the lower trolley section bear against and ride on the parallel, elongated lower surfaces of the two load rails 20, and the four load wheels 58 of the upper trolley section ride on the parallel, elongated upper surfaces of the two load rails 20. Accordingly, under the action of the two springs 40 that unite the upper and lower trolley sections, the load wheels 58 and 56 embrace the load rails 20 and run on the top and bottom surfaces thereof and thus are confined to the path defined by the load rails 20, while the four drive wheels 34 are maintained in contact with the drive tube 14 by the action of springs 36. A transported load on platform 54 of each conveyor unit of the system is thus carried and maintained above the underlying conveyor apparatus and clear of all of the drive components.

It should be understood that while certain forms of this invention have been illustrated and described, it is not limited thereto except insofar as such limitations are included in the following claims.

Having thus described the invention, what is claimed as new and desired to be secured by Letters Patent is:

1. A conveyor system for carrying a load along a generally horizontally extending conveying path comprising:
    a drive shaft extending along the conveying path and mounted for rotation about a shaft axis,
    at least one trolley above said drive shaft and adapted to support a load, and having a plurality of driven wheels engaging said drive shaft and mounted for rotation about a corresponding plurality of driven wheel axes non-parallel and non-perpendicular to said shaft axis,
    load rail structure above said drive shaft, extending generally parallel thereto and presenting elongated, upper and lower running surfaces,
    said trolley having upper load wheels thereon running on said upper running surface, lower load wheels running on said lower running surface, upper and lower parts carrying said upper and lower load wheels respectively, and a resilient element connected with said parts and yieldably biasing said upper load wheels into running contact with said upper running surface, and
    a product support carried by said trolley above said drive shaft for bearing transported products,
    each of said upper and lower parts being elongated, extending longitudinally along the conveying path and having a transverse, inverted U-shaped configuration, there being a plurality of said resilient elements connected with said parts for yieldably biasing said upper load wheels into running contact with said upper running surface.

2. A conveyor system for carrying a load along a generally horizontally extending conveying path comprising:
    a drive shaft of consistent diameter presenting a longitudinally continuous surface extending along the conveying path and mounted for rotation about a longitudinally extending shaft axis,
    at least one trolley above said drive shaft and adapted to support a load, and having a plurality of driven wheels engaging said surface of the drive shaft and mounted for rotation about a corresponding plurality of driven wheel axes non-parallel and non-perpendicular to said shaft axis,
    load rail structure above said drive shaft, extending generally parallel thereto and presenting an elongated, upwardly facing running surface and a lower, downwardly facing running surface,
    said trolley having upper load wheels thereon running on said upper running surface, lower load wheels running on said lower running surface, upper and lower parts carrying said upper and lower load wheels respectively, and a resilient element connected with said parts and maintaining said load wheels in running contact with said running surfaces, and
    a product support carried by said trolley above said drive shaft for bearing transported products,
    each of said upper and lower parts extending longitudinally along the conveying path and having a transverse, inverted U-shaped configuration, there being a plurality of said resilient elements connected with said parts for yieldably biasing said upper load wheels into running contact with said upper running surface.

3. The system as claimed in claim 2, wherein said trolley includes a member mounting said driven wheels below said load wheels, and a component connected with said member and biasing said driven wheels into engagement with said surface of the drive shaft.

* * * * *